(12) United States Patent
Ludvig et al.

(10) Patent No.: US 7,543,319 B2
(45) Date of Patent: Jun. 2, 2009

(54) PRESENTING NOTIFICATIONS IN RESPONSE TO VIEWER-INITIATED ACTIONS

(75) Inventors: Edward A. Ludvig, Redwood City, CA (US); Vadim Gorokhovsky, Redmond, WA (US); Amir Gharaat, Menlo Park, CA (US); John Comito, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 10/918,216

(22) Filed: Aug. 13, 2004

(65) Prior Publication Data

US 2006/0064700 A1   Mar. 23, 2006

(51) Int. Cl.
*H04N 7/16*   (2006.01)
*H04N 7/10*   (2006.01)
*H04N 7/025*  (2006.01)
*H04N 7/173*  (2006.01)

(52) U.S. Cl. ............................. 725/34; 725/1; 725/58; 725/87

(58) Field of Classification Search ............. 725/32–35, 725/40, 60, 61
See application file for complete search history.

(56) References Cited

U.S. PATENT DOCUMENTS

| 5,970,125 | A  | * | 10/1999 | Smith et al. ............... 379/93.25 |
| 6,317,791 | B1 |   | 11/2001 | Cohn et al. |
| 6,587,835 | B1 | * | 7/2003  | Treyz et al. .................... 705/14 |
| RE38,376  | E  |   | 12/2003 | Matthews, III |
| 7,308,698 | B1 | * | 12/2007 | Heughebaert et al. ......... 725/37 |
| 2002/0026638 | A1 | * | 2/2002 | Eldering et al. ............... 725/42 |

* cited by examiner

*Primary Examiner*—Dominic Saltarelli
(74) *Attorney, Agent, or Firm*—Lee & Hayes, PLLC

(57) ABSTRACT

Notification data is received and stored at a client device. A notice represented by the notification data is then displayed to the television viewer when a channel change event is detected. The notification data may also include data that indicates how the notice is to be displayed.

28 Claims, 8 Drawing Sheets

PRESENTING NOTIFICATIONS IN RESPONSE TO VIEWER-INITIATED ACTIONS

TECHNICAL FIELD

This invention relates to television viewer notification, and more specifically to presenting notifications to television viewers when a viewer-initiated action is detected.

BACKGROUND

Subscription television providers (e.g., cable, satellite, and so on) occasionally have a need to send a notification to one or more of their customers. For example, a provider may wish to notify subscribers when their bill is due or delinquent. Other types of notifications may include a notification that a particular channel is offering a free preview during a particular time period. Existing systems enable the transmission of notifications over a network to a client device. When the client device receives the notification, the notification is typically stored, and can by accessed by the viewer through a menu system. Other systems display notifications on the screen as soon as they are received.

Both of these scenarios present problems, however. In the first, a viewer must actively navigate a menu system to locate and view notifications that have been received. With this sort of an implementation, there is no real motivation for the viewer to look at the notifications, and therefore, the viewer may never see the notification that indicates that his cable bill is past due. In the second scenario, there is no guarantee that a viewer will see the notification that is received and immediately displayed. For example, if the television is powered off when a notification is received, or if the television is on, but no one is watching it when the notification is received, then the notification will not be seen by a viewer. To alleviate that problem, such notifications may be configured to persist indefinitely until dismissed by a viewer. This ensures that a viewer sees the notifications, but can cause other problems. For example, if a viewer is recording a particular program when a notification is received, if the notification is configured to persist indefinitely, the notification will obscure the program that is being recorded.

Accordingly, a need exists for a technique for presenting a notification that better insures that the notification is observed by a television viewer.

SUMMARY

Techniques for presenting notifications to a television viewer in response to a viewer-initiated action are described. Notification data, which may include a notice and display attributes that describe how the notice is to be displayed, is transmitted to a client device. The client device receives and stores the notification data. When the client device detects a viewer-initiated action (e.g., a channel change event), the client device displays the notice. How the notice is displayed may be determined based on the received display attributes.

DETAILED DESCRIPTION

Overview

The embodiments described below provide techniques for displaying notifications in response to a channel change event. It is recognized, however, that other types of viewer-initiated actions may also be used as a catalyst for displaying a notification. For example, any button press on a remote control device (e.g., pressing a Menu button or pressing a volume control button) may be used to trigger the display of a previously received notification. In the described exemplary implementation, notifications are transmitted to a client device where they are stored until a user initiates a channel change event. At that time, the notification is displayed. Because it is fairly safe to assume that a channel change event is initiated by a user, waiting until a channel change is initiated to display a notification increases the chances that a television viewer will see the notification.

Depending on the urgency of the notification, the notification may be presented with varying degrees of conspicuousness. For example, when a television viewer has been invoiced for the television service, a relatively inconspicuous notification taking up only a small portion of the screen, may be displayed. However, if the television viewer doesn't pay his bill on time, when the viewer's account is 30 days late, a more conspicuous notification taking up approximately one half of the screen, may be displayed. Finally, if the viewer still does not pay his bill, when the viewer's account is 60 days late, a notification taking up the entire screen may be displayed.

In an exemplary implementation, other types of notifications may also be transmitted to the client device and configured to be displayed immediately upon receipt. This may be appropriate for urgent notifications, which would then be displayed even to viewers who are, for example, watching a long movie, or who tend to watch several programs back-to-back on the same channel. In this way, these notifications will be presented even if a channel change event is not detected.

In the described exemplary implementation, a notification is generated at a headend system and transmitted to a client device. The notification is stored in memory at the client device until a channel change event is detected. At that point, the received notification is displayed. When a notification is generated at the headend, various attributes may be associated with the notification. These attributes are transmitted to the client as part of the notification, and indicate, for example, what data is to be displayed and how the data is to be displayed. For example, one attribute of a notification may be the amount of screen space that the notification is to cover when it is displayed. Additional notification attributes that may be configured (e.g., display duration and channel change persistence) will be described in further detail below.

User Experience

Figure 1:
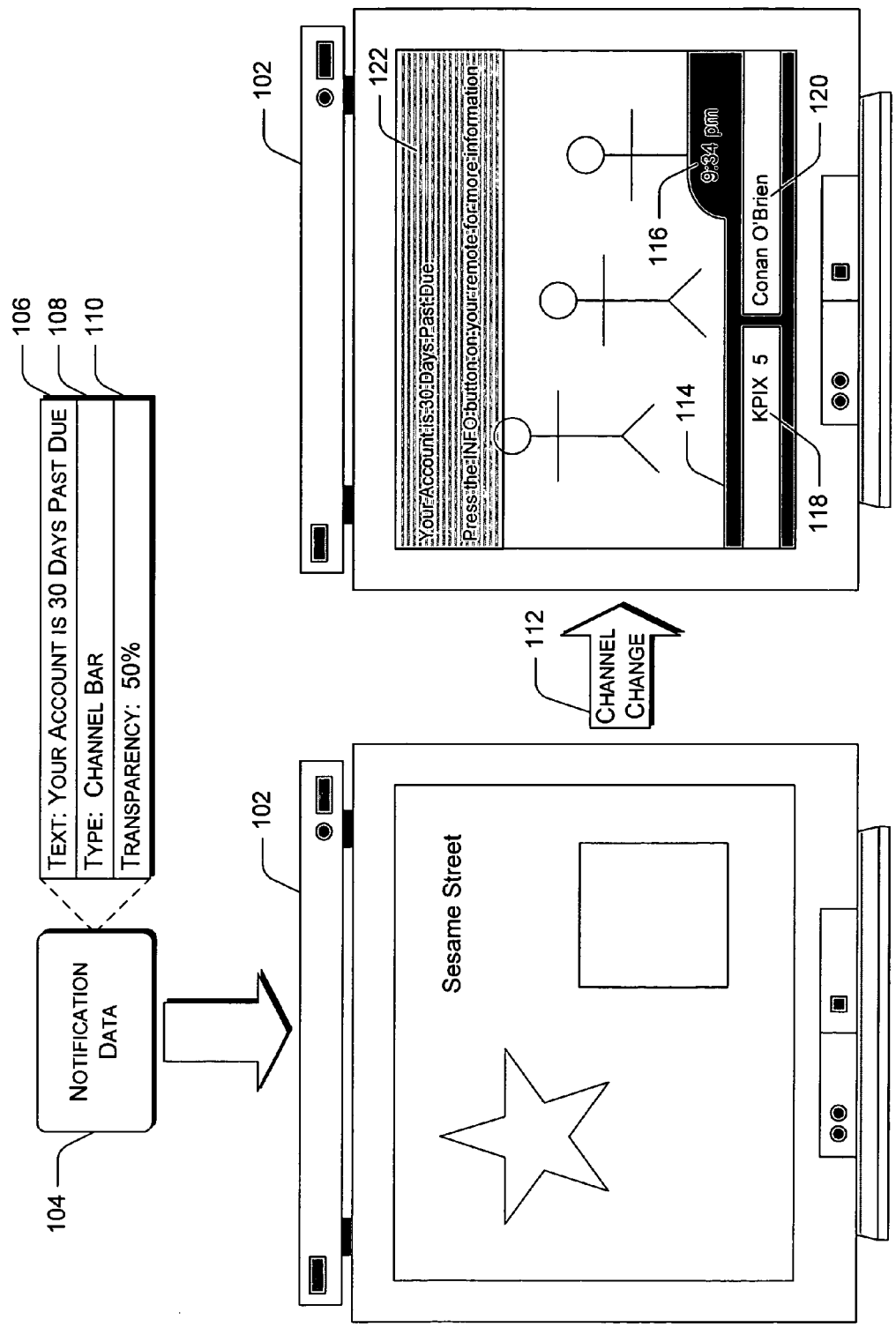
FIG. 1 is a pictorial diagram that illustrates display of a channel bar notification in response to a channel change event.

FIG. 1 illustrates display of an exemplary channel bar notification in response to a channel change event. In the illustrated example, while the client device 102 is tuned to a particular channel (e.g., channel 4, currently airing an episode of "Sesame Street"), the client device 102 receives notification data 104. In the illustrated example, notification data 104 includes a text attribute 106, a type attribute 108, and a transparency attribute 110. The notification data 104 is received and stored in memory on the client device 102 until a user initiates a channel change event, for example, by pressing a channel up button on a remote control.

When a channel change event 112 is initiated, the client device tunes to the designated channel (e.g., channel 5, currently airing an episode of "Conan O'Brien"). In the illustrated example, a channel bar 114 is displayed in response to a channel change event. The channel bar may include, for example, the current time 116, the current channel 118, and the name of the program 120 currently being shown on that channel. In addition, in the illustrated example, if notification data associated with a channel bar notification has been received (as indicated by the type attribute 108), then the channel bar notification 122 is also displayed.

In alternate implementations, channel bar 114 may or may not be displayed when the channel is changed. Furthermore, although illustrated as being displayed at that top of the screen, channel bar notification 122 may be displayed anywhere on the screen (e.g., a top portion of the screen, a bottom portion of the screen, just above a channel bar at the bottom of the screen, just below a channel bar at the top of the screen, within a channel bar, along either side of the screen, across the middle of the screen, or in any other designated area of the screen).

In the illustrated example, channel bar notification 122 is displayed in a semi-transparent overlay across the currently airing program. In an exemplary implementation, the degree of transparency may be configured differently for different types of notifications (as indicated by the transparency attribute 110).

Figure 2:
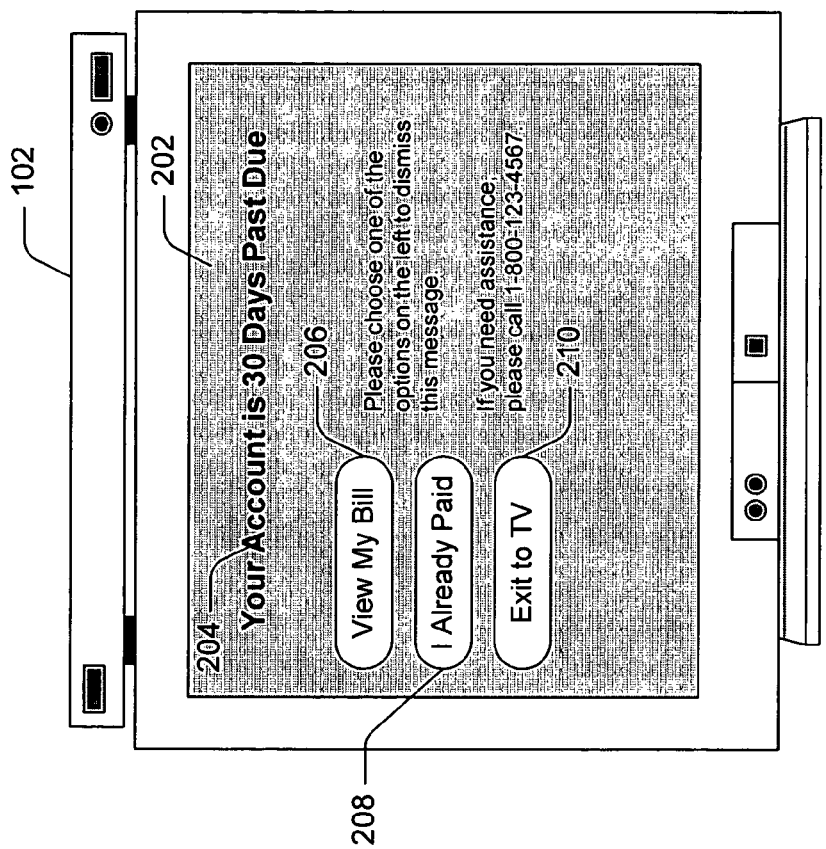
FIG. 2 is a pictorial diagram that illustrates display of details associated with a notification.

FIG. 2 illustrates display of a notification details screen 202 that may be displayed, for example, if the user presses an INFO button on a remote control while channel bar notification 122 is being displayed. Exemplary notification details screen 202 includes notification text 204 and one or more selectable options for dismissing the notification. Notification text 204 may be the same as notification text 106 on the channel bar notification 122 from which the user navigated to the notification details screen 202. In an alternate implementation, the notification text 204 may be different (e.g., more detailed) than notification text 106. In the illustrated example, the selectable options for dismissing the notification include a "View My Bill" button 206, an "I Already Paid" button 208, and an "Exit to TV" button 210. When selected, the "View My Bill" button 206 directs client device 102 to dismiss the notification and request that billing data associated with the client device 102 be displayed. When selected, the "I Already Paid" button 208 directs client device 102 to dismiss the notification and transmit data to the headend system indicating that the user has paid their bill. When selected, the "Exit to TV" button 210 directs client device 102 to tune back to the previously tuned channel, dismissing the notification.

In the described implementation, when a notification is dismissed, it is removed from memory on the client device 102, and thus, is not displayed again.

In alternate implementations, depending on the purpose of the notification, different types of selectable options may be presented to the user for dismissing the notification. For example, a notification that indicates a free preview is coming up for a particular subscription channel may include a button that may be selected to indicate that the viewer wishes to add the particular subscription channel to their subscription.

Figure 3:
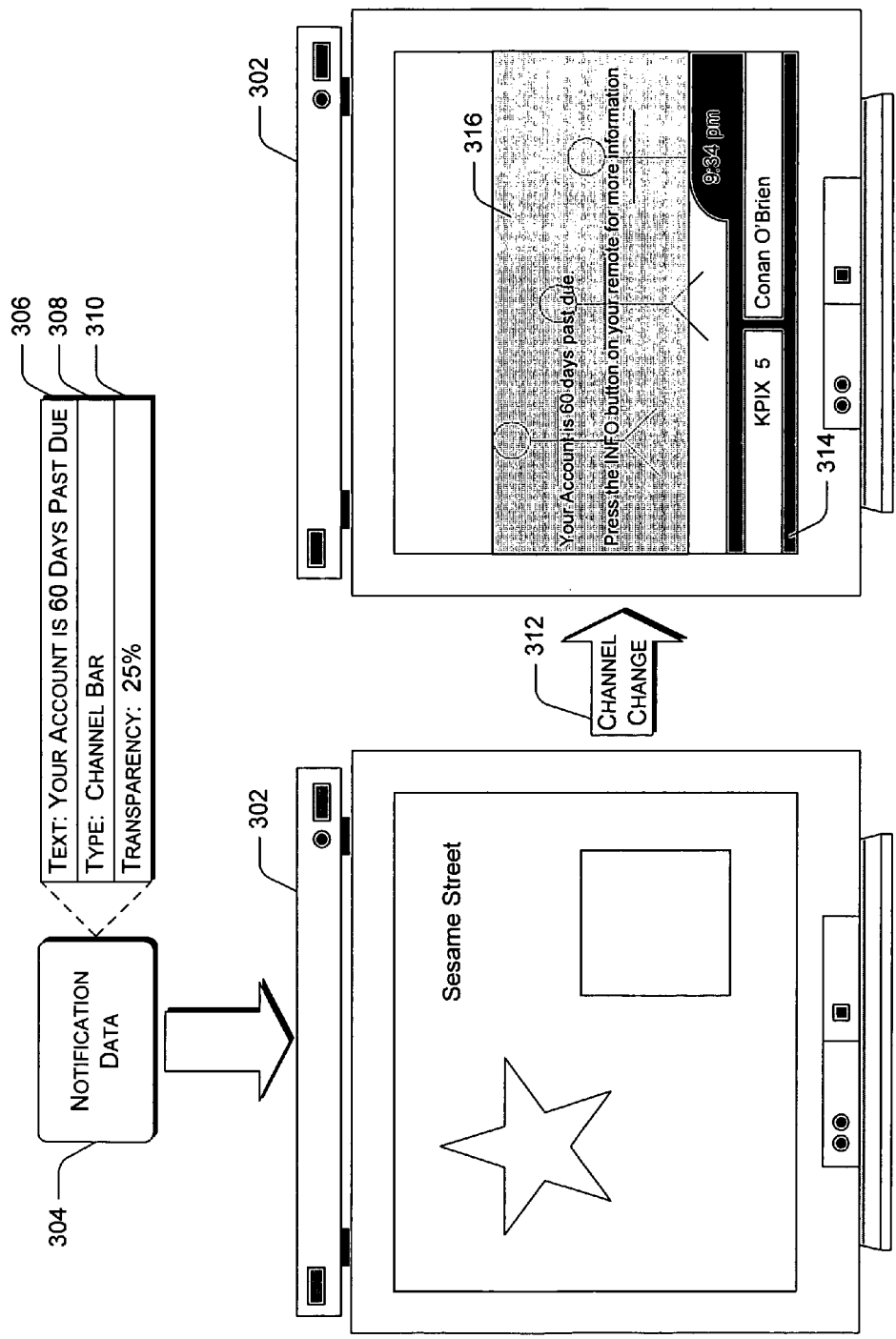
FIG. 3 is a pictorial diagram that illustrates display of a more conspicuous channel bar notification in response to a channel change event.

FIG. 3 illustrates display of a more conspicuous channel bar notification in response to a channel change event. In the illustrated example, while the client device 302 is tuned to a particular channel (e.g., channel 4, currently airing an episode of "Sesame Street"), the client device 302 receives notification data 304. In the illustrated example, notification data 304 includes a text attribute 306, a type attribute 308, and a transparency attribute 310. The notification data 304 is received and stored in memory on the client device 302 until a user initiates a channel change event, for example, by pressing a channel up button on a remote control.

When a channel change event 312 is initiated, the client device 302 tunes to the designated channel (e.g., channel 5, currently airing an episode of "Conan O'Brien"). In the illustrated example, a channel bar 314 is displayed in response to a channel change event. An exemplary channel bar is described in further detail above with reference to FIG. 1. In addition, in the illustrated example, if notification data associated with a channel bar notification has been received (as indicated by the type attribute 308), then the channel bar notification 316 is also displayed. Notification details similar to those shown in FIG. 2 may be displayed if the user presses the INFO button on a remote control while channel bar notification 316 is displayed.

In the illustrated example, channel bar notification 316 is defined to obscure approximately 40% of the screen, and is centered between the top and the bottom of the screen. In alternate implementations, a channel bar notification may be defined to obscure more or less of the screen. The described configurable notifications provide for notifications of varying viewer annoyance levels to be presented to the viewer. For example, when a viewer has been billed for their subscription, a channel bar notification may be sent that is configured to be minimally annoying to the viewer. However, if the viewer fails to pay their bill on time, a more annoying notification (e.g., one that takes up more screen area and/or is less transparent) may be sent to the viewer. If the viewer continues to not pay their bill, an even more annoying notification (e.g., one that takes up the entire screen area and/or is not transparent) may be sent to the viewer.

Figure 4:
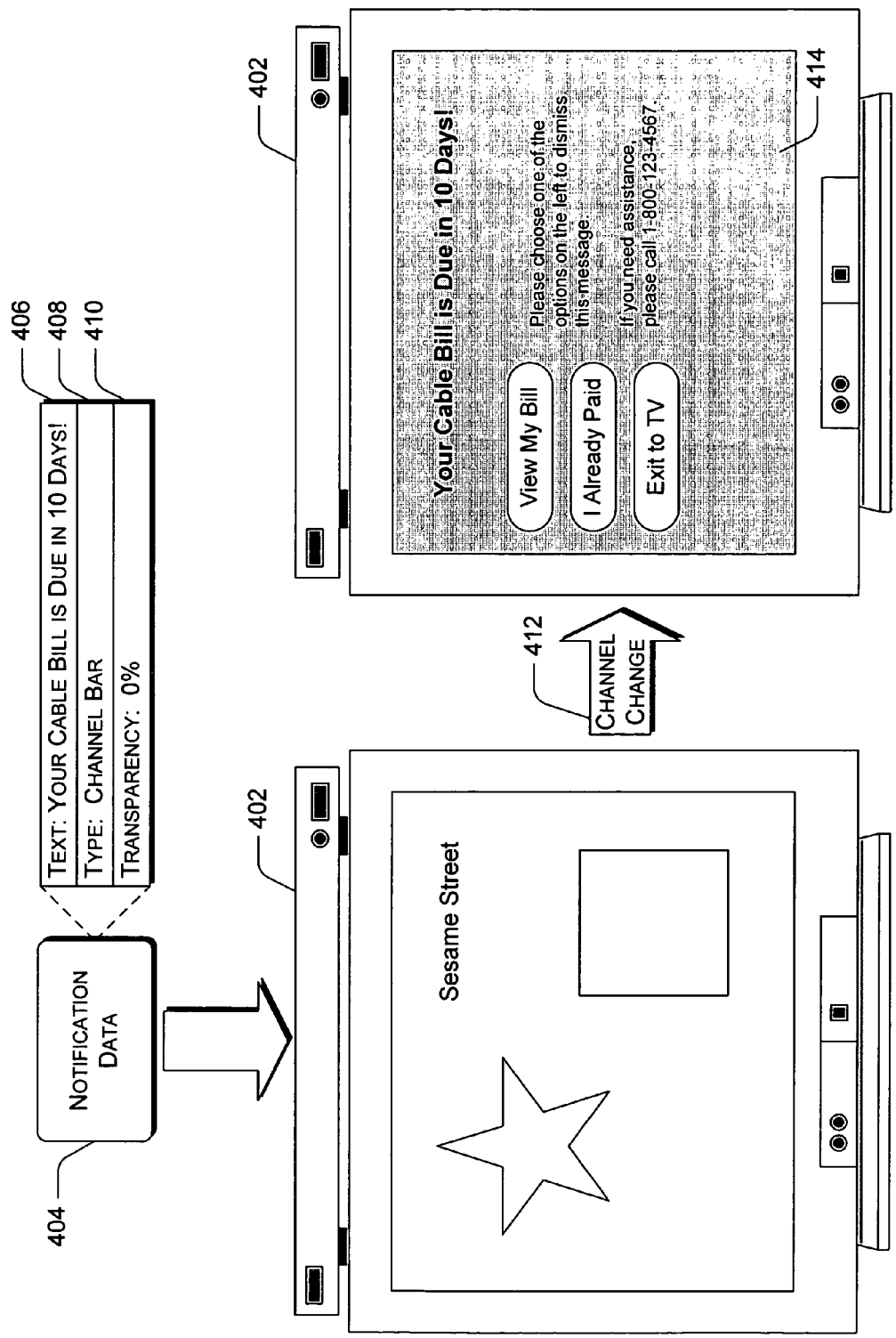
FIG. 4 is a pictorial diagram that illustrates display of a channel bar notification that blocks the entire screen in response to a channel change event.

FIG. 4 illustrates display of an exemplary channel bar notification that blocks the entire screen in response to a channel change event. In the illustrated example, while the client device 402 is tuned to a particular channel (e.g., channel 4, currently airing an episode of "Sesame Street"), the client device 402 receives notification data 404. In the illustrated example, notification data 404 includes a text attribute 406, a type attribute 408, and a transparency attribute 410. The notification data 404 is received and stored in memory on the client device 402 until a user initiates a channel change event, for example, by pressing a channel up button on a remote control.

When a channel change event 412 is initiated, the client device tunes to the designated channel, and also displays channel bar notification 414, based on the received notification data 404. In the illustrated implementation, channel bar notification 414, which is configured to block the entire screen, is formatted in the same way as the display of notification details, as illustrated in FIG. 2. Because the channel bar notifications are configurable, a channel bar notification that blocks the entire screen may alternately be configured to include, for example, just the notification text, and may require the user to take some action (e.g., press an INFO button on a remote control) in order to see the notification details, which may include selectable buttons that may be used to dismiss the notification.

Network Environment

Figure 5:
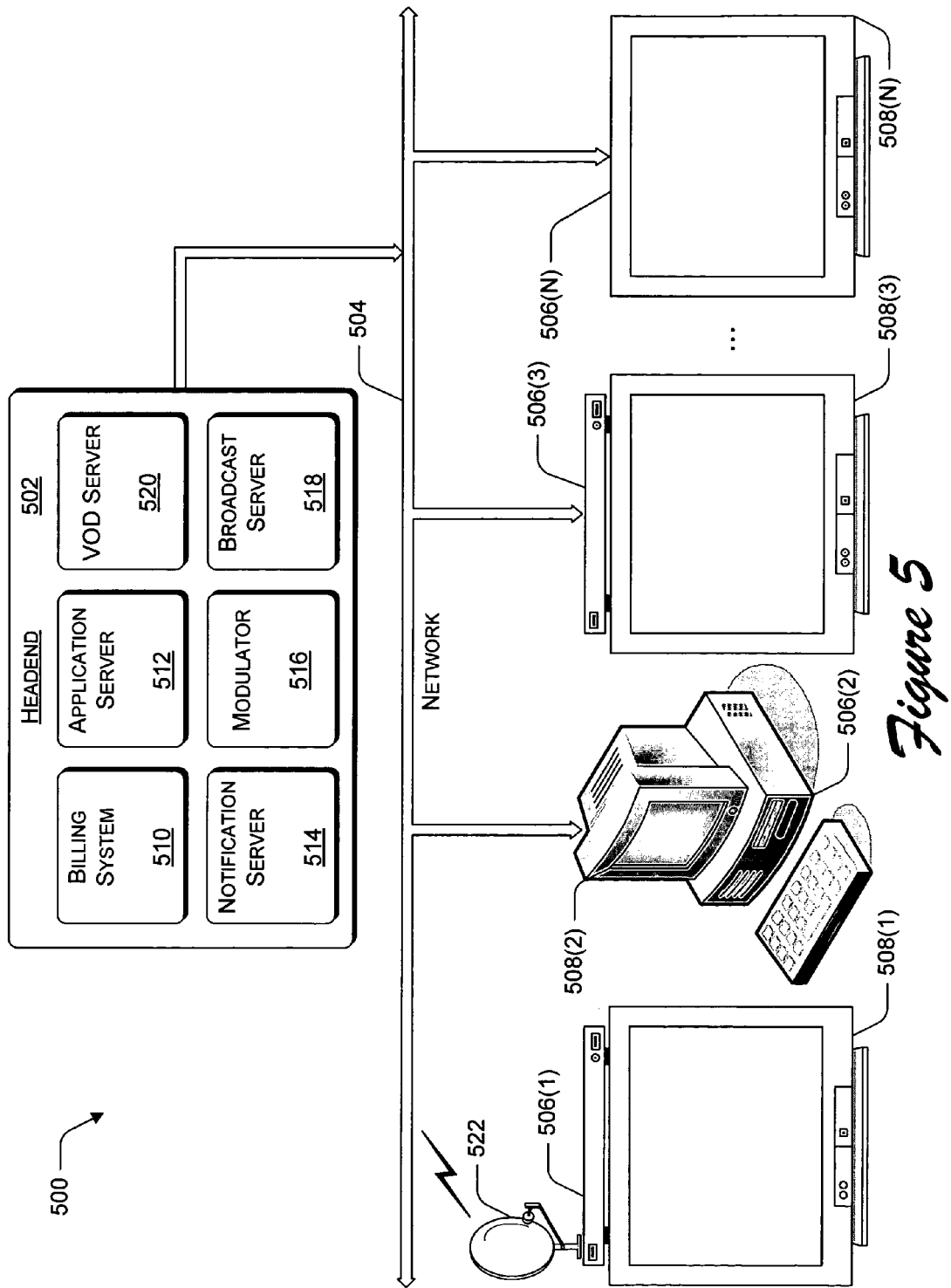
FIG. 5 is a block diagram that illustrates an exemplary environment in which notifications may be transmitted and presented to one or more viewers.

FIG. 5 illustrates an exemplary environment 500 in which notifications may be sent to a client device and presented to a television viewer in response to a channel change event. Environment 500 includes a headend 502, a network 504, and multiple client devices 506(1), 506(2), 506(3), . . . , 506(N), each with an associated display device 508(1), 508(2), 508 (3), . . . , 508(N). In the illustrated implementation, headend 502 is representative of a subscription television system headend (e.g., cable television system headend, satellite television provider, IP-based television provider, etc.), and client devices 506 are representative of television set-top boxes or any other type of client device configured to receive data (e.g., notification data) and broadcast media content (e.g., television programs) over network 504. Client devices 506 may be implemented as any of a number of devices, including, but not limited to, a cable television set-top box, a satellite receiver, a digital video recorder (DVR), a personal computer, and so on.

Exemplary headend 502 includes billing system 510, application server 512, notification server 514, and modulator 516. Headend 502 also includes broadcast server 518 and/or video-on-demand (VOD) server 520. Headend 502 typically includes other components as well, which are not illustrated in FIG. 5, such as a processor, one or more memory components, one or more network interfaces, and so on. The described exemplary implementation is described in the context of a system that generates notifications that are based on billing data. It is recognized, however, that alternate implementations may generate notifications based on other types of data as well.

Billing system 510 maintains billing data associated with subscribers of a subscription television system, such as a cable television system. In the described exemplary implementation, billing system 510 associates a billing status with each subscriber. Examples of billing status may include: paid, invoiced, 30 days late, 60 days late, and 90 days late.

Application server 512 is configured to communicate with the billing system 510 to determine which subscribers should be sent which notifications. For example, channel bar notifications may be sent to client devices associated with accounts that have been invoiced or are 30 days late. A partial screen blocking notification may be sent to client devices associated with accounts that are 60 days late. Finally, a full screen blocking notification may be sent to client devices associated with accounts that are 90 days late.

Application server 512 may also be configured to communicate with other systems to generate notifications to be sent to client devices based on other criteria. For example, application server 512 may examine subscriber account information to determine which subscriptions do not currently include a particular premium channel. A notification may then be sent to the client devices associated with those account, indicating that a free preview of the premium channel is coming up. The notification may also include a selectable option that allows a viewer to add the premium channel to their subscription.

Notification server 514 is configured to control the order and rate at which notifications are sent. In an exemplary implementation, notifications are sent over an out-of-band portion of network 504 with limited bandwidth. Accordingly, the rate at which the notifications are sent is regulated to prevent overloading the out-of-band network. Modulator 516 conditions the signal that includes the notifications for transport over the network 504, for example, by converting the notification data into a format that can be transmitted over the network.

VOD server 520 is configured to store and transmit video content that is available to television viewers on demand. Broadcast server 518 is configured to transmit video content (e.g., television programs) and/or electronic program guide data over network 504 to one or more of the client devices 506.

Client devices 506(1), 506(2), 506(3), . . . , 506(N) are configured to receive broadcast television programs, electronic program guide data, notifications, and other data (e.g., video-on-demand content, advertisements, etc.) over network 504. Client devices 506 may be implemented as any of a number of devices. For example, client device 506(1) is representative of a satellite television set-top box configured to receive broadcast television data through satellite receiver 522.

Client device 506(2) is implemented as a personal computer that includes a hard drive. Personal computer 506(2) is coupled to a computer monitor or television 508(2) for presenting media content that is received over network 504.

Client device 506(3) is implemented as a television set-top box that may include DVR capabilities. Client device 506(3) is coupled to a television 508(3) for presenting the content received by the client device (e.g., audio data and video data), as well as a graphical user interface.

Client device 506(N) is an example of a combination television 508(N) and integrated set-top box 506(N). In this example, the various components and functionality of the set-top box are incorporated into the television, rather than using two separate devices. The set-top box incorporated into the television receives broadcast signals via broadcast network 504.

A particular client device 506 can be coupled to any number of televisions 508 and/or similar devices that can be implemented to display or otherwise render content. Similarly, any number of client devices 506 can be coupled to a television 508. For example, a personal computer may be implemented as an additional client device capable of receiving EPG data and/or media content and communicating with a set-top box or television.

In alternate implementations, client devices 506 may receive broadcast signals via the Internet or any other broadcast medium, including, but not limited to, a cable television network, telephone twisted pair cables, and so on.

Notification Attributes

Table 1, below, lists exemplary attributes that may be used to define a notification.

TABLE 1

| Attribute Name | Description | Example Values |
| --- | --- | --- |
| Type | Format of the notification | Channel Bar, Partial Screen Blocking, Full Screen Blocking |

TABLE 1-continued

| Attribute Name | Description | Example Values |
|---|---|---|
| Size | Size of notification on the screen | 40%, 60%, 100%, pixel dimensions |
| Text | The text of the notification | "Your Account is 30 Days Late" |
| Graphic | An image to be displayed as part of the notification. | A filename associated with an image of a network operator logo |
| Transparency | The degree of transparency with which the notification is to be displayed. | 75%, 50%, 25%, 0% |
| Persistence Time | How long the notification will remain on the screen following the channel tune event. | 3 sec, 5 sec, 10 sec, indefinitely |
| Channel Changes | Number of sequential channel changes for which the notification will be displayed. | 3, 5 |
| Skipped Changes | Number of sequential channel changes that will be skipped before the notification will be displayed again. | 5, 10 |
| Frequency | How often the notification will be sent to the client device. | Hourly, Daily, Weekly |
| Grace Period | Time to wait before transmitting the notification again if user claims to have already responded to the notification. | 3 days, 5 days, 10 days |

In alternate implementations, notifications may be defined with more or fewer attributes than those listed above. For example, a screen location attribute may be used to define where a particular notification is to be rendered on a screen. Additionally, some notification attributes may be required while others may be optional. For example, the text attribute may be required while the graphic attribute may be optional. Furthermore, default values for some attributes may be associated with particular values for other attributes. For example, when a notification is defined with a type attribute equal to "Full Screen Blocking", the transparency attribute may be assigned a default value of 0%. In an exemplary implementation, the default value may be overridden if a different value is specified for the attribute that has an associated default value.

In the described exemplary implementation, the type attribute is used to indicate a display format for the notification. Examples may include channel bar, partial screen blocking, or full screen blocking, each of which may have configurable display attributes. In the described exemplary implementation, channel bar notifications are displayed in response to a viewer-initiated action (e.g., a channel change), while screen blocking notifications are displayed immediately upon receipt. Alternate implementations may support more or fewer notification types than those listed.

The size attribute is used to specify the amount of area on the screen that the notification is to occupy. In an exemplary implementation, the notification is designed to fill the width of the screen, and the size attribute specifies the percentage of the screen height that is to be filled with the notification. In an alternate implementation, the size attribute may specify display dimensions of the notification, for example in terms of pixel height and width.

The text attribute is used to specify a textual message that is to be displayed when the notification is rendered. Similarly, the graphic attribute is used to specify an image (e.g., a .bmp or .jpg file) that is to be displayed when the notification is rendered.

The transparency attribute is used to specify a degree of transparency with which the notification is to be displayed. In an alternate implementation, a default transparency may be associated with each valid type attribute. For example, a channel bar type notification may have a default transparency of 75%, a partial screen blocking type notification may have a default transparency of 40%, and a full screen locking type notification may have a default transparency of 0%. As described above, the transparency attribute may be used to override a default value that is assigned based on the selection of a particular type attribute value (or other attribute value).

The persistence time attribute is used to specify an amount of time for which the notification is to persist on the screen when it is displayed. For example, a channel bar notification can be defined with a 3 second persistence time so that when a viewer changes the channel and the notification is displayed, the notification remains on the screen for 3 seconds before vanishing. In an exemplary implementation, a specific value (e.g., 0 or a negative number) may be used to indicate that the notification is to persist indefinitely, requiring input from the viewer to dismiss the notification. This may be desirable, for example, if the notification is extremely important and it is imperative that the viewer see the notification. In an exemplary implementation, full screen blocking notifications are defined to persist indefinitely, requiring the viewer to take some action to dismiss the notification.

The channel changes attribute is used to specify a number of sequential channel changes for which the notification will be displayed. In an exemplary implementation, one channel change is counted when the client device remains tuned to a particular channel for some specified period of time (e.g., 2 seconds). For example, if a viewer rapidly presses the channel up or channel down button, quickly scrolling through several channels, it will only count as one channel change. In this way, the viewer can't avoid a notification by just quickly changing the channel several times. Rather, the notification will be presented when a channel change operation is counted (e.g., when the tuner tunes to one channel for at least 2 seconds), and will be presented for a number of sequential counted channel changes, as defined by the channel changes attribute in the notification definition.

The skipped changes attribute may be used to specify a number of channel changes to be skipped before displaying the notification again. For example, if the channel changes attribute has a value of 2 and the skipped changes attribute has a value of 3, then when a viewer changes the channel a first time, the notification will be displayed. When the viewer changes the channel a second time, the notification will be displayed again. When the viewer changes the channel a third, fourth, and fifth time, the notification will not be displayed, but when the viewer changes the channel a sixth and seventh time, the notification will again be displayed. After the viewer dismisses the notification (e.g., by selecting one of the options from the notification details screen, as illustrated in FIG. 2), the notification is erased from the client device memory and is not shown again unless it is re-transmitted to the client device from the headend.

The frequency attribute may be used to specify how often the notification is to be transmitted to the client device. For example, if the notification is one indicating that the viewer has been invoice for their account, the notification may be sent to the client device just once. However, if the notification is one indicating that the viewer's account is past due, then the frequency attribute may be set to indicate that the notification is to be sent once per week. That way, the notification will be presented to the user every week until they pay their bill, even if they dismiss the notification.

The grace period attribute may be used to specify an amount of time during which the notification is not to be re-transmitted to the client device in an event that the viewer indicates that the notification has been responded to. For example, if the notification indicates that the viewer's account is past due, and the viewer selects an "I've Already Paid" button from a notification details page (e.g., as shown in FIG. 2), then for the duration specified by the grace period attribute, the notification will not be re-sent to the client device. This mechanism enables the viewer to dismiss the notification without it reappearing for some time, during which the cable operator may, for example, receive a payment on the viewer's account, thereby changing the account status and rendering the notification no longer applicable to the viewer.

Notification definitions are created, for example, by an administrator associated with the notification server 514. Application server 512 then maps notifications to client devices based, for example, on a billing status associated with a client account. As described above, various types of data may be used to identify notifications to be sent to specific client devices. For example, in the described exemplary implementation, the notification server administrator assigns a billing status to a particular notification. Application server 512 then queries the billing system to determine, based on billing status, which client devices are to receive the particular notification. The notification is then transmitted over network 504 to the identified client devices 506.

Exemplary Client Device

Figure 6:
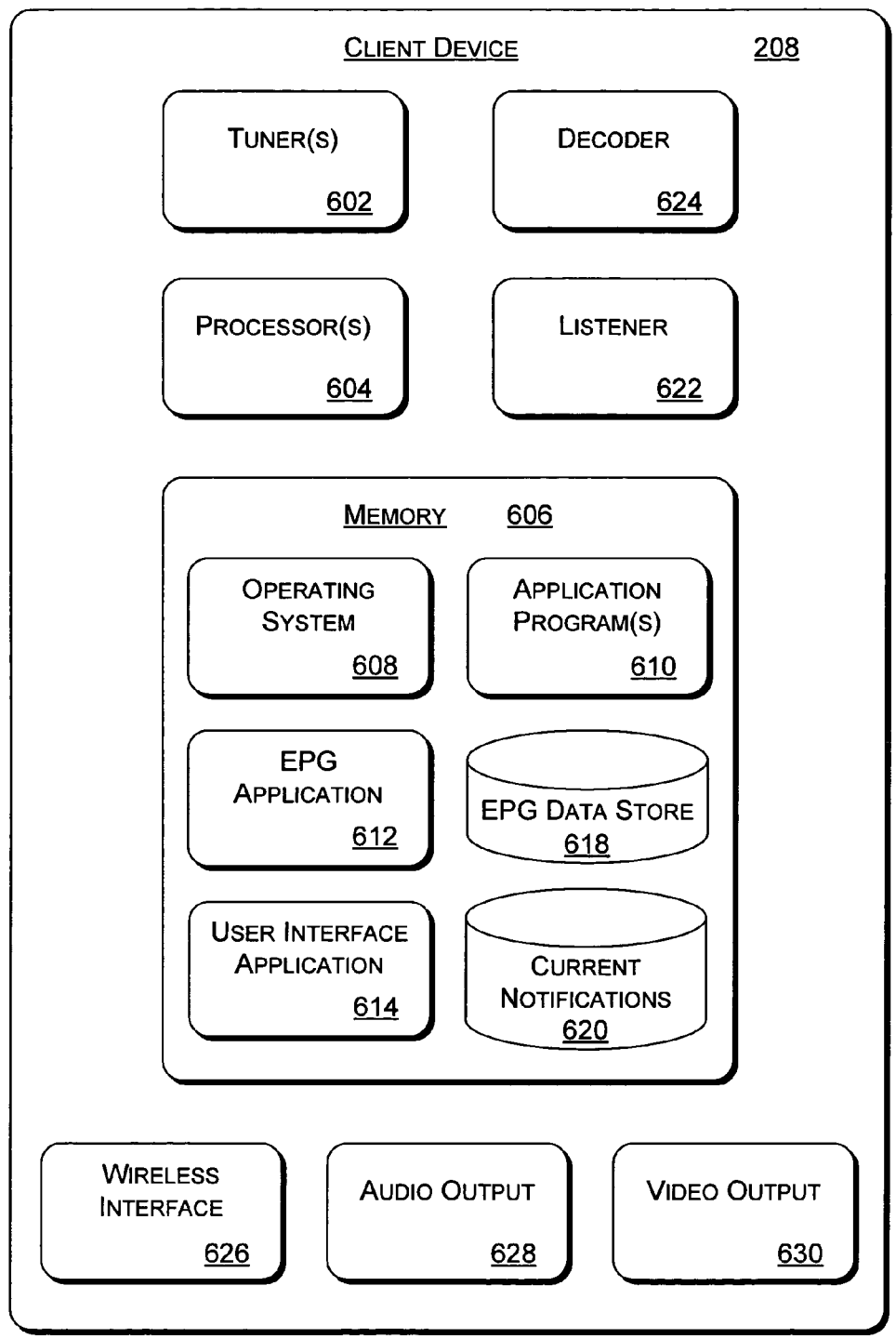
FIG. 6 is a block diagram that illustrates select components of an exemplary client device as illustrated in FIG. 5.

FIG. 6 illustrates select components of an exemplary client device 208. As described above, client device 208 can be implemented in any number of embodiments, for example, as a satellite receiver, a set-top box, a TV recorder with a hard disk, a personal computer, and so forth. Exemplary client device 208 includes one or more tuners 602. Tuners 602 are representative of one or more in-band tuners that may be configured to tune to various frequencies or channels to receive television signals, as well as one or more out-of-band tuners that may be configured to tune to one or more broadcast channels over which other data, such as electronic program guide (EPG) data and notifications, may be broadcast to client device 208.

Client device 208 also includes one or more processors 604 and one or more memory components 606. Examples of possible memory components include a random access memory (RAM), a disk drive, and a non-volatile memory (e.g., ROM, Flash, EPROM, EEPROM, etc.). Alternative implementations of client device 208 can include a range of processing and memory capabilities, and may include more or fewer types of memory components than those listed.

Processor(s) 604 process various instructions to control the operation of client device 208 and to communicate with other electronic and computing devices. The memory 606 stores various information and/or data such as media content, EPG data, configuration information for client device 208, graphical user interface information, viewing history data, notification data, and so on.

An operating system 608 and one or more application programs 610 may be stored in memory 606 and executed on processor 604 to provide a runtime environment. A runtime environment facilitates extensibility of client device 208 by allowing various interfaces to be defined that, in turn, allow application programs 610 to interact with client device 208. The application programs 610 that may be implemented at client device 208 can include, for example, a video-on-demand application for enabling a user to purchase VOD content. Electronic program guide (EPG) application 612 and user interface application 614 are specific applications that may be stored in memory 606 and executed on processor(s) 604.

EPG application 612 receives EPG data that is broadcast from headend 502. The EPG data that is received may then be stored in EPG data store 618. Typically, the EPG data that is received identifies media content that will be available during a particular period of time (e.g., the next two weeks). EPG application 612 may be configured to present a channel bar when a user changes the channel. EPG application 612 may also be configured to manage the presentation of notifications that are received from headend 502.

EPG data store 618 may be implemented in any number of ways to store EPG data. For example, EPG data store 618 may be implemented as a relational database, an object-oriented database, a set of one or more text files, a set of one or more XML files, and so on.

User interface application 614 provides a user interface. The user interface may be configured, for example, to enable a television viewer to schedule particular programs to be recorded, to access billing information associated with their account, and/or to pay their bill electronically. In an alternate implementation, user interface application 614 may be configured to manage the presentation of received notifications.

Current notifications data store 620 maintains notification data that has been received from headend 502. In an exemplary implementation, the notification data that is stored in current notifications data store 620 is managed by either EPG application 612 or user interface application 614. In an alternate implementation, a separate notifications application (not shown) may be configured to manage the notifications. Alternatively, notification management may be shared by multiple applications.

Client device 208 also includes a listener 622 that is configured to listen to an out-of-band portion of network 504 for notifications that are directed to client device 208. When a notification for client device 208 is detected, listener 504 receives the notification data and stores the notification data in current notifications data store 620. In an exemplary implementation, listener 622 is also configured to transmit an acknowledgement back to headend 502, indicating that the notification data has been received. An acknowledgement may be transmitted over an up-stream out-of-band portion of network 504.

Client device 208 also includes a decoder 624 to decode a broadcast signal, such as DVB, MPEG-2, WM9, or other digitally encoded signal. Client device 208 further includes a wireless interface 626 that allows client device 208 to receive input commands and other information from a user-operated input device, such as from a remote control device or from another IR, Bluetooth, or similar RF input device.

Client device 208 also includes an audio output 628 and a video output 630 that provide signals to a television or other display device 508 that processes and/or presents or otherwise renders the audio and video data.

Client device 208 may also include other components, which are not illustrated in this example for simplicity purposes. For instance, client device 208 may include user interface lights, buttons, controls, etc. to facilitate viewer interaction with the device.

Viewer Notification Methods

Figure 7:
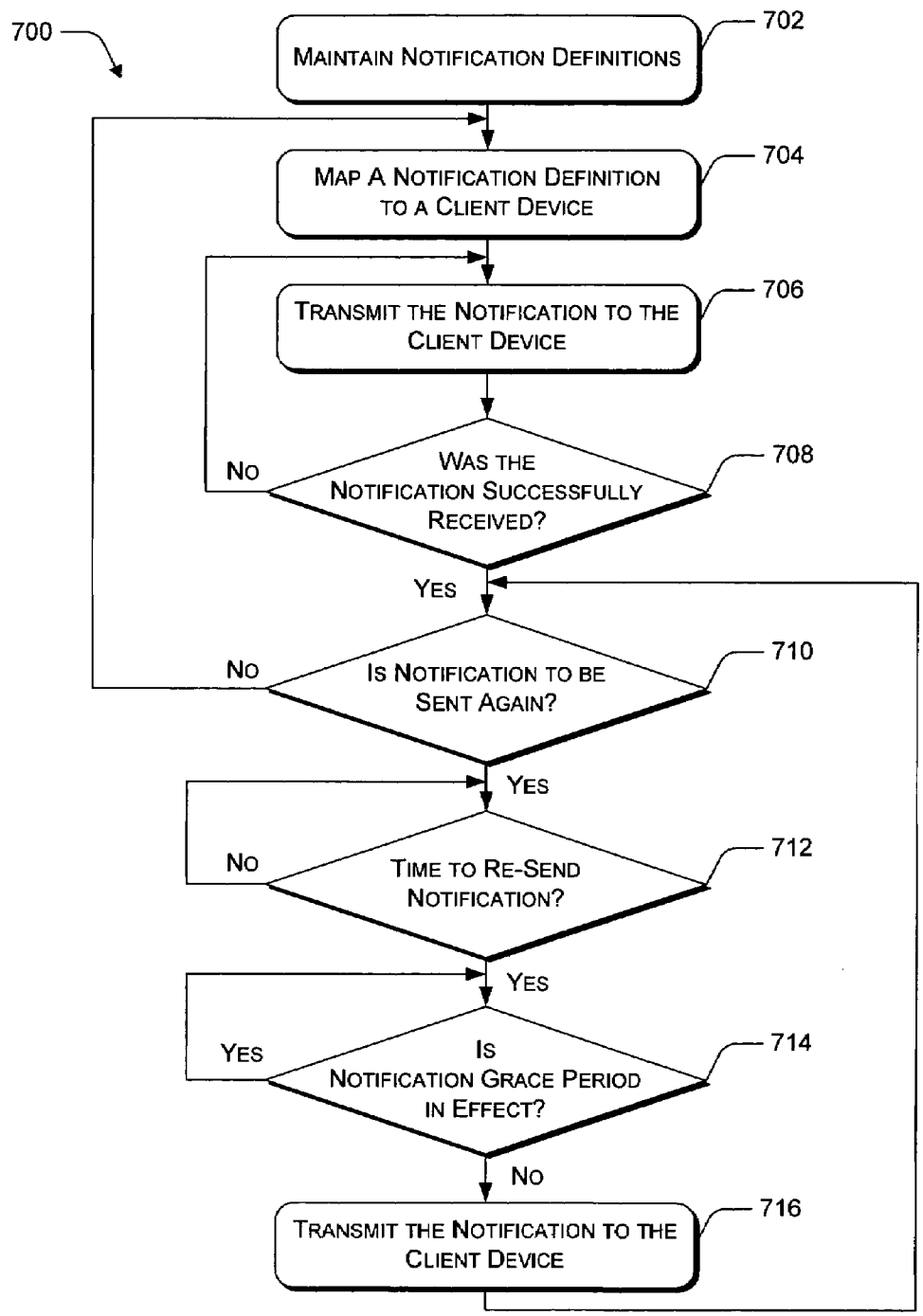
FIG. 7 is a flow diagram that illustrates an exemplary method for transmitting notifications to a client device.

FIG. 7 is a flow diagram that illustrates an exemplary method 700 for sending a notification to a client device. The illustrated process can be implemented in any suitable hardware, software, firmware, or combination thereof.

At block 702, a server system maintains one or more notification definitions. For example, a system administrator may define one or more notifications and store those notifications at a cable television system headend. In an exemplary implementation, the notification definitions may be maintained by an application server component 512 of headend 502.

At block 704, application server 512 maps a notification definition to a particular client device. For example, application server 512 may communicate with billing system 510 to identify a client device associated with an account that qualifies for a particular notification based, for example, on a billing status. In an exemplary implementation, one notification may be configured to be sent to client devices associated with accounts that have been invoiced, while another notification may be configured to be sent to client devices associated with accounts that are 30 days late. As application server 512 maps a notification to a client device, the addressed notification is passed to notification server 514.

For example, a first notification may be associated with a level 1 billing status, where the level 1 billing status is assigned to an account when it is invoiced. A second notification may be associated with a level 2 billing status, where the level 2 billing status is assigned to an account when it is 20 days late. Given two subscribers, one whose billing date is the first of the month, and one whose billing date is the 10th of the month, on the first of the month, when the first subscriber account is invoiced, the first notification is mapped to and sent to any client devices associated with that account. Similarly, on the same day, assuming the second subscriber has not paid their bill, their account is 20 days late, and so, the second notification is mapped to and sent to any client devices associated with that account.

At block 706, notification server 514 transmits the notification to the client device to which it is addressed. In an exemplary implementation, notification server 514 monitors the traffic on an out-of-band portion of network 504, and regulates the transmission of the notifications to prevent overloading the out-of-band network.

At block 708, notification server 514 determines whether or not the notification was successfully received by the client device. In an exemplary implementation, when a client device receives a notification the client device transmits an indication that the notification has been received back to the headend, for example, over an upstream portion of the out-of-band network. If, as represented by the "No" branch from block 708, the headend does not receive a response from the client device indicating that the notification was received (e.g., the client device is disconnected from a power supply or is on a faulty network, and so is not receiving data), then the notification is resent, as described above with reference to block 706. The frequency with which the notification is retransmitted is controlled by the notification server. For example, a notification that was not successfully received may be retransmitted twice a day until the notification server receives confirmation that the notification has been successfully received.

At block 710, when notification server 514 has determined that the notification was successfully received by the client device (the "Yes" branch from block 708), notification server 514 determines whether or not the notification is to be sent again. As described above, a notification definition may have any of a number of attributes, which may include a frequency attribute. The frequency attribute defines how often the notification is to be re-transmitted to the client device.

If at block 710 it is determined that the notification is not to be sent again (the "No" branch from block 710), then processing for this particular notification ends, and server processing continues at block 704 with additional notifications being mapped to client devices.

On the other hand, if it is determined that the notification is to be sent again (the "Yes" branch from block 710), then at block 712 notification server 514 determines, based on the frequency attribute of the notification, whether or not it is time to re-send the notification. If the amount of time specified by the frequency attribute has not passed since the notification was last sent, then notification server waits (the "No" branch from block 712).

When the time period specified by the frequency attribute has passed (the "Yes" branch from block 712), then at block 714, notification server 514 determines whether or not a grace period is in effect for the notification. In the described exemplary implementation, a viewer can respond to a notification in such a way as to initiate a grace period that is specified as an attribute of the notification. For example, if the notification indicates that a viewer's account is due or past due, then if the viewer responds by selecting an "I Already Paid" button (as illustrated in FIG. 2 and described with reference thereto, above), then a response is sent from the client device to the notification server, indicating that the grace period is now in effect. In this way, the notification will not be re-sent to the client device for the time period specified in the grace period attribute, giving time, for example, for the viewer's payment to reach the provider and the viewer's account to be updated to reflect the payment. If it is determined that the grace period is in effect and the amount of time specified by the grace period attribute has not passed since the notification was last sent, then the notification server waits (the "Yes" branch from block 714).

If it is determined that a grace period is not in effect (e.g., either a grace period was never initiated, or the grace period has expired), then at block 716, notification server 514 re-transmits the notification to the client device. In an exemplary implementation, the system may re-check the billing status to verify that the notification that is appropriate for the current billing status is sent. That is, the billing status may have changed since the time at which the previous notification was sent.

Processing then continues as described above with reference to block 710. In the described exemplary implementation, notifications may be periodically cleared from the notification server and re-mapped to reflect any changes to client account data that is used to determine which notifications are to be sent to which client devices.

Figure 8:
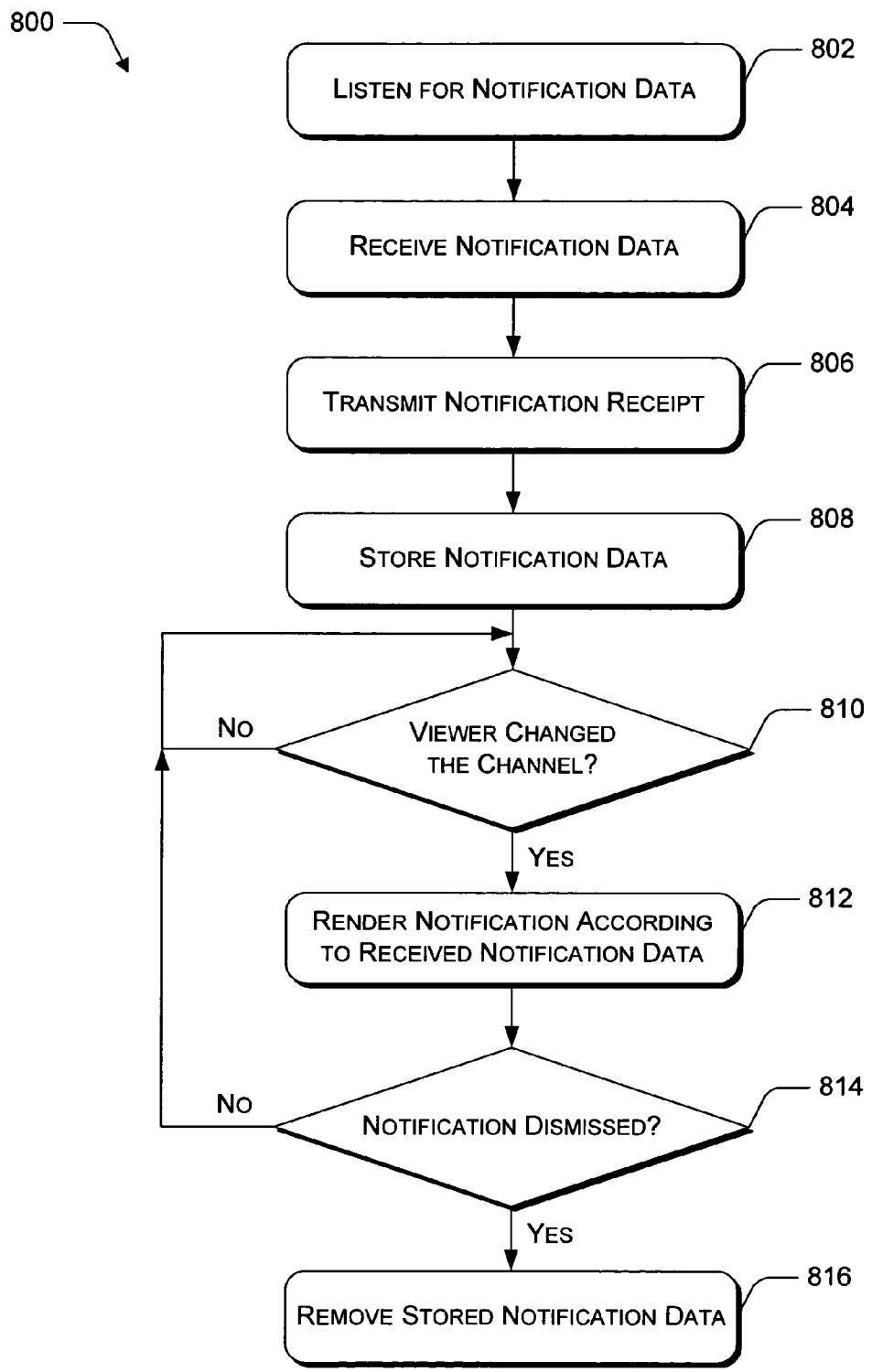
FIG. 8 is a flow diagram that illustrates an exemplary method for receiving and presenting notifications to a viewer.

FIG. 8 is a flow diagram that illustrates an exemplary method 800 for receiving notification data and displaying a notification in response to a channel change event. The illustrated process can be implemented in any suitable hardware, software, firmware, or combination thereof.

At block 802, a client device listens for notification data. For example, listener 622 listens to an out-of-band portion of network 504 for notification data that is directed to client device 208.

At block 804, the client device receives notification data. For example, when listener 622 detects a notification that is directed to client device 208, the listener pulls the notification data off the network.

At block 806, the client device transmits a notification receipt back to the server. For example, listener 622 may be configured to transmit an acknowledgement back to headend 502, indicating that the notification data was successfully received.

At block 808, the client device stores the received notification data. For example, listener 622 stores the received notification data in current notifications data store 620.

At block 810, the client device waits for a viewer to change the channel. Because the notification data is to be displayed in response to the viewer changing the channel, it is important that multiple quick presses of a channel up or channel down button are not each recognized as a trigger for displaying the notification, more than once. Accordingly, in an exemplary implementation, the client device determines that the viewer has changed the channel when a tuner 602 receives a channel change command, tunes from one channel to another channel. Additional channel changes that occur within some pre-defined period of time (e.g., two seconds) are considered part of a single channel change, and are not counted against the value specified in the channel change attribute.

When it is detected that a viewer has changed the channel (the "Yes" branch from block 810), then at block 812, the client device renders the notification according to the received notification data. As described above with reference to Table 1, the notification data may include values for several attributes associated with a notification. In the described implementation, the notification is rendered according to those attribute values that are received. Depending on the implementation, the interpretation of the notification data and presentation of a notification may be controlled by EPG application 612, user interface application 614, or a notification application implemented specifically for this purpose.

At block 814, client device determines whether or not the notification has been dismissed by the viewer. For example, as described above with reference to FIG. 2, a viewer can dismiss a notification by taking some action associated with the notification. An example action may be selecting a particular button to indicate that the viewer has paid their bill.

If the notification is not dismissed (the "No" branch from block 814), then processing continues at block 810. The client device continues to wait for a viewer to change the channel. When a viewer channel change is detected, the most recently received notification stored in current notifications data store 620 is presented according to its notification data. In alternate implementations, if multiple notifications are stored in current notifications data store 620, presentation of the notifications may be handled in any number of ways. For example, two or more notifications may be presented simultaneously in different areas on the screen or a different notification may be presented on each sequential channel change. Alternatively, notifications may be assigned priorities, and only the highest priority notification that is currently in current notifications data store 620 may be displayed on each channel change. In the described exemplary implementation, if multiple notifications are stored in current notifications data store 620, the most recently received notification is displayed.

After a notification is dismissed (the "Yes" branch from block 814), at block 816, the client device removes the notification data associated with the dismissed notification from the current notifications data store 620. In this way, the notification will not be presented again, unless it is received again from the headend.

CONCLUSION

The techniques described above enable configurable notifications to be presented to television viewers based on a channel change event. Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is;

1. A method comprising:
receiving a notification to be presented to a viewer, wherein the notification is:
associated with at least one of a plurality of different billing states related to a subscription television system, wherein each of the plurality of billing states:
specifies a billing status related to the subscription television system; and
depends on the urgency of the notification to be presented to the viewer; and
assigned a priority based on the at least one of the plurality of different billing states associated with a subscriber's billing status, wherein the priority specifies an annoyance level associated with the notification to be presented to the viewer, so that more urgent notifications are assigned a higher priority resulting in a higher annoyance level of presentation of the notification to the viewer;
detecting a viewer-initiated event; and
in response to the viewer-initiated event, presenting the notification to the viewer.

2. The method as recited in claim 1 wherein the notification comprises:
an attribute defining a notice; and
an attribute defining how the notice is to be presented.

3. The method as recited in claim 2 wherein the attribute defining the notice comprises at least one of a text attribute or a graphic attribute.

4. The method as recited in claim 2 wherein the attribute defining how the notice is to be presented is selected from a plurality of attributes, the plurality of attributes comprising:
a type attribute specifying the format of the notification;
a size attribute specifying the size of the notification on the screen;
a transparency attribute specifying the degree of transparency with which the notification is to be displayed;
a persistence time attribute specifying how long the notification remains on the screen;
a channel changes attribute specifying a number of sequential channel changes for which the notification is displayed; and
a skipped changes attribute specifying a number of sequential channel changes that are skipped before the notification will be displayed again.

5. The method as recited in claim 2 wherein the notification further comprises an attribute defining how often the notification is to be transmitted to a client device in order to be presented to the viewer.

6. The method as recited in claim 5 wherein the attribute defining how often the notification is to be transmitted comprises at least one of:
a frequency attribute specifying a periodic schedule for transmitting the notification; or
a grace period attribute specifying a predetermined time to wait before transmitting the notification again.

7. The method as recited in claim 1 further comprising maintaining the notification at a client device so the notification can be displayed more than once.

8. The method as recited in claim 7 wherein the maintaining comprises storing the notification in memory.

9. The method as recited in claim 1 wherein the viewer-initiated event comprises at least one of a channel change event or a remote control button press.

10. The method as recited in claim 1 wherein the detecting comprises:
determining that a tuner is tuned to a first channel; and
determining that the tuner has received a channel change command.

11. The method as recited in claim 10, wherein the detecting further comprises determining that a tuner has been tuned to a second channel for at least a specified period of time.

12. The method as recited in claim 1 wherein the presenting comprises displaying text associated with the notification in a partially transparent screen overlay.

13. The method as recited in claim 12 wherein the partially transparent screen overlay covers less than 100% of a screen display area.

14. The method as recited in claim 1 wherein the presenting comprises displaying text associated with the notification in a non-transparent screen overlay.

15. The method as recited in claim 14 wherein the non-transparent screen overlay covers 100% of a screen display area.

16. The method as recited in claim 1 further comprising transmitting an indication that the notification has been received, to a system from which the notification was sent.

17. One or more computer-readable media encoded with computer-readable instructions thereon which, when executed by a computer, configure the computer to implement the method as recited in claim 1.

18. A method comprising:
maintaining notification data defining a notification;
automatically associating the notification data with a client device based on at least one of a plurality of billing states associated with the client device, wherein each of the plurality of billing states:
specifies a billing status related to a subscription television system; and
depends on the urgency of the notification to be presented on the client device;
assigning a priority to the notification data based on the at least one of the plurality of billing states associated with the client device, wherein the priority specifies an annoyance level associated with the notification to be presented on the client device, so that more urgent notifications are assigned a higher priority resulting in a higher annoyance level of presentation of the notification on the client device; and
transmitting the notification data to the client device in response to a user-initiated event.

19. The method as recited in claim 18 further comprising:
determining a frequency associated with the notification;
determining whether a time period specified by the frequency has passed since the notification data was last transmitted to the client device; and
in an event that the time period specified by the frequency has passed, transmitting the notification data to the client device again.

20. The method as recited in claim 18 further comprising:
determining whether a grace period associated with the notification has been initiated; and
in an event that a grace period associated with the notification has been initiated, preventing the notification data from being transmitted to the client device again until the grace period has expired.

21. The method as recited in claim 20 further comprising:
in an event that a grace period associated with the notification has expired:
determining a current status associated with the client device;
determining notification data associated with the current status; and
transmitting the notification data associated with the current status to the client device.

22. The method as recited in claim 18 further comprising:
receiving data from the client device indicating that a user has responded to the notification; and
initiating a grace period associated with the notification.

23. One or more computer-readable media encoded with computer-readable instructions thereon which, when executed by a computer, cause the computer to implement the method as recited in claim 18.

24. A system comprising:
a processor;
a memory; and
a listener configured to receive a notification that is transmitted over a network, wherein the notification is:
associated with at least one of a plurality of different billing states, wherein each of the plurality of different billing states:
specifies a billing status related to a subscription television system; and
depends on the urgency of the notification to be presented to a user; and
assigned a priority based on the at least one of a plurality of different billing state states associated with a subscriber's billing status, wherein the priority specifies an annoyance level associated with a presentation of the notification to the user, so that more urgent notifications are assigned a higher priority resulting in a higher annoyance level of presentation of the notification to the user; and
an application stored in the memory and executed on the processor, the application configured to:
detect a channel change event; and
in response to the channel change event, present the notification to the user.

25. The system as recited in claim 24 wherein the application is implemented as at least one of an electronic program guide application or a user interface application.

26. The system as recited in claim 24 wherein the listener is further configured to transmit an acknowledgement to a server when the notification data is received.

27. The system as recited in claim 24 wherein the application is further configured to maintain the notification in memory until the channel change event is detected.

28. The system as recited in claim 24 wherein the application is further configured to present the notification according to display parameters associated with the notification the display parameters comprising:
- a type attribute specifying the format of the notification;
- a size attribute specifying the size of the notification on the screen;
- a transparency attribute specifying the degree of transparency with which the notification is to be displayed;
- a persistence time attribute specifying how long the notification remains on the screen;
- a channel changes attribute specifying a number of sequential channel changes for which the notification is displayed; and
- a skipped changes attribute specifying a number of sequential channel changes that are skipped before the notification will be displayed again.

\* \* \* \* \*